(12) United States Patent
Mamyshev (10) Patent No.: US 12,025,841 B2
(45) Date of Patent: Jul. 2, 2024

(54) PHOTONIC INTEGRATED CIRCUIT (PIC) PACKAGE

(71) Applicant: Lumentum Operations LLC, San Jose, CA (US)

(72) Inventor: Pavel Mamyshev, Morganville, NJ (US)

(73) Assignee: Lumentum Operations LLC, San Jose, CA (US)

( * ) Notice: Subject to any disclaimer, the term of this patent is extended or adjusted under 35 U.S.C. 154(b) by 219 days.

(21) Appl. No.: 17/763,381

(22) PCT Filed: Sep. 24, 2020

(86) PCT No.: PCT/US2020/052377
§ 371 (c)(1),
(2) Date: Mar. 24, 2022

(87) PCT Pub. No.: WO2021/061899
PCT Pub. Date: Apr. 1, 2021

(65) Prior Publication Data
US 2022/0365296 A1    Nov. 17, 2022

Related U.S. Application Data

(60) Provisional application No. 62/906,847, filed on Sep. 27, 2019.

(51) Int. Cl.
*G02B 6/42* (2006.01)
(52) U.S. Cl.
CPC ........... *G02B 6/423* (2013.01); *G02B 6/4202* (2013.01); *G02B 6/4239* (2013.01)

(58) Field of Classification Search
None
See application file for complete search history.

(56) References Cited

U.S. PATENT DOCUMENTS

| 5,482,585 | A | * | 1/1996 | Ota | G02B 6/3839 |
| | | | | | 156/158 |
| 5,703,973 | A | * | 12/1997 | Mettler | G02B 6/30 |
| | | | | | 385/52 |
| 6,250,819 | B1 | * | 6/2001 | Porte | G02B 6/423 |
| | | | | | 385/88 |
| 10,288,812 | B1 | * | 5/2019 | Evans | G02B 6/30 |
| 10,488,596 | B2 | | 11/2019 | Akiyama | |
| 11,036,015 | B2 | * | 6/2021 | Shikama | G02B 6/3648 |
| 2003/0214991 | A1 | | 11/2003 | Wiedmann et al. | |

(Continued)

OTHER PUBLICATIONS

Carroll L., et al., "Photonic Packaging: Transforming Silicon Photonic Integrated Circuits into Photonic Devices," Applied Sciences, 2016, vol. 6 (12), pp. 1-21.

(Continued)

*Primary Examiner* — Jerry Rahll
(74) *Attorney, Agent, or Firm* — Harrity & Harrity, LLP (57) ABSTRACT

A method and system for an optical package assembly is disclosed. According to one example, the optical package assembly includes a photonic integrated circuit (PIC) chip, at least one fiber coupled to the PIC chip, a fiber lid plate disposed on at least a portion of the at least one fiber, and a cover plate having a surface coupled to the PIC chip and the fiber lid plate.

30 Claims, 9 Drawing Sheets

(56) References Cited

U.S. PATENT DOCUMENTS

2016/0116688 A1* 4/2016 Hochberg ............ G02B 6/4232
                                                        385/14
2016/0124164 A1   5/2016 Doerr
2019/0137706 A1*  5/2019 Xie ...................... G02B 6/4202

OTHER PUBLICATIONS

International Search Report and Written Opinion for Application No. PCT/US2020/052377, dated Dec. 24, 2020, 5 pages.
Extended European Search Report for Application No. EP20867895.3, dated Jul. 25, 2023, 9 pages.

* cited by examiner

PHOTONIC INTEGRATED CIRCUIT (PIC) PACKAGE

CROSS-REFERENCE TO RELATED APPLICATIONS

The present application claims the benefit of U.S. Provisional Application Ser. No. 62/906,847 filed Sep. 27, 2019, which is fully incorporated herein by reference.

BACKGROUND

Technical Field

Aspects of the present disclosure are directed to packaging of photonic integrated circuits (PICs) and more specifically to an improved system and method for PIC packaging.

Background Discussion

A photonic integrated circuit (PIC) is a device that integrates multiple photonic devices in a circuit on a single substrate. For example, a PIC may comprise optical switches, multiplexers/demultiplexers, couplers, routers, splitters, waveguides, optical-to-electrical (O/E) and electrical-to-optical (E/O) signal converters (e.g., photodiodes, lasers), modulators, amplifiers, wavelength converters, etc. During operation, the PIC requires the ability to efficiently couple light between an external optical fiber and one or more on-chip waveguides. There are two main coupling strategies for accomplishing this task.

In the first method, light from the optical fibers is coupled in/out of the PIC using diffractive grating couplers. Optical fibers are butt-coupled normal to a grating coupler positioned on the flat surface of the PIC and light exits/enters the PIC normal to the flat surface. While these out-of-plane surface grating couplers offer significantly more relaxed alignment tolerances than the edge couplers described below, disadvantages include their limited spectral bandwidth and strong polarization sensitivity, the latter of which can make them unsuitable for telecom and datacom applications.

In the second method, the optical fiber is coupled to the edge of the PIC. In contrast to surface grating couplers, edge couplers typically have a low polarization sensitivity, exhibit a broadband response, and have lower insertion losses. Edge coupling is usually implemented between a PIC and a lensed fiber. Attachment of the optical fibers to PICs requires a high level of precision alignment and stability. For instance, depending on the optical mode size of the PIC couplers, even a fraction of a micron offset can significantly increase coupling losses.

Figure 1A:
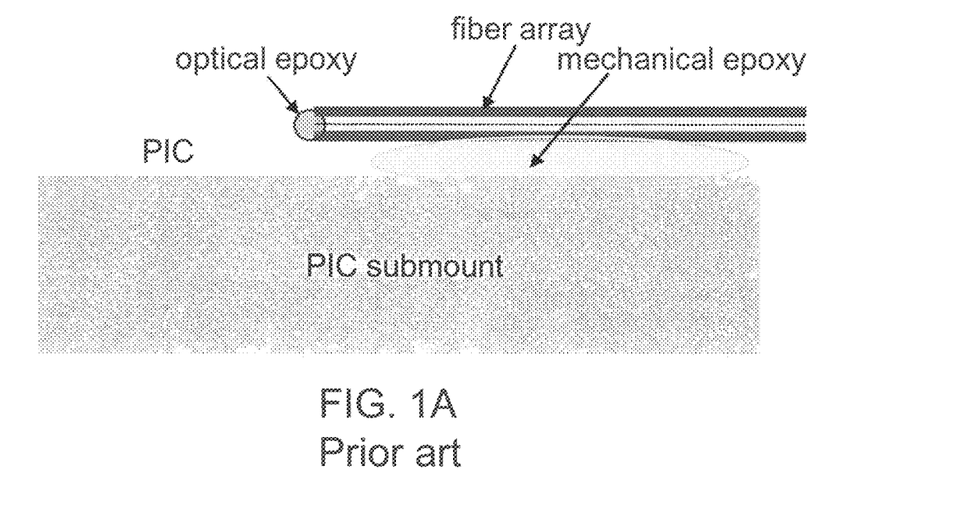
FIG. 1A is a cross-section of a first example of a fiber array that is aligned and attached to a PIC according to the prior art.
Figure 1B:
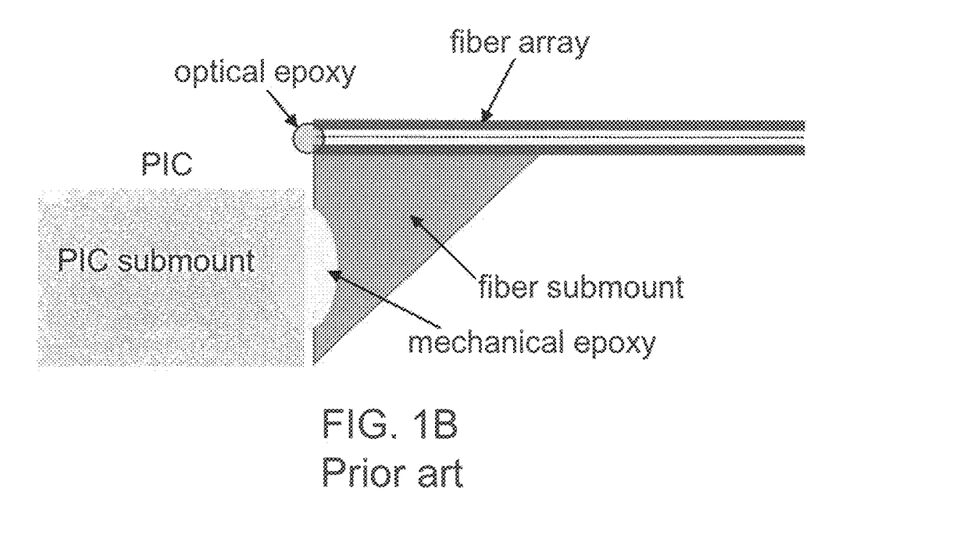
FIG. 1B is a cross-section of a second example of a fiber array that is aligned and attached to a PIC according to the prior art.

Two examples of prior art fiber-to-chip edge coupling techniques are shown in FIGS. 1A and 1B. PICs are typically attached to boards electrically and mechanically using wire-bonding or flip-chip technology and an adhesive material (e.g., epoxy or other underfill material). For butt-coupling light between the fibers and the edge couplers of the PIC, the fiber or fibers are first aligned with the PIC couplers for a maximum coupling efficiency and then attached with the adhesive material. As shown in FIGS. 1A and 1B, an optical-grade adhesive, such as an optical-grade epoxy, is used between the fiber facets and the inputs of the PIC edge couplers. In this instance, the optical-grade adhesive also functions as an index-matching medium that corrects for a refractive index difference between the two adjoining mediums of the fibers and the PIC couplers. However, on its own, the cured optical-grade adhesive fails to provide sufficient mechanical strength and stability to maintain the optical alignment over time and under stress. Additional attachment mechanisms of the fiber or fibers is therefore necessary, which are also shown in FIGS. 1A and 1B and discussed below.

In some instances, this additional attachment is implemented using an underfill technique that mechanically couples the fiber or fibers to an underlying base. In the example shown in FIG. 1A, this approach utilizes an adhesive material such as a mechanical-grade epoxy between the fiber array and the PIC submount. In other instances, the fiber array is attached or otherwise supported by a fiber submount that is itself attached to the PIC submount using a mechanical-grade epoxy, as shown in FIG. 1B. In both instances, a mechanical-grade epoxy is suitable as an adhesive material since it is not disposed in any optical path. This allows for a wider choice of epoxy materials that offer superior mechanical properties over those provided by the optical-grade adhesive used between the fibers and the PIC.

Epoxy materials undergo volumetric "shrinkage" during the curing process and different types of epoxies (i.e., optical-grade vs. mechanical-grade) exhibit shrinkage at different rates. The shrinkage of the mechanical-grade epoxy as it cures poses a problem in the PIC packaging examples shown in FIGS. 1A and 1B in that the force exerted during curing can be large enough to pull the fibers out of alignment. For instance, in FIG. 1A, a downward force is exerted on the fiber array as the mechanical-grade epoxy cures. The situation is somewhat improved in FIG. 1B where a lateral force in the direction of the PIC submount is exerted during curing of the mechanical epoxy.

Both of the attachment mechanisms shown in FIGS. 1A and 1B couple the fiber array to the board or base onto which the PIC is mounted. This arrangement raises another problem in maintaining alignment between the fibers and the PIC. Differences in the coefficient of thermal expansion (CTE) between the PIC and the board materials mean that temperature fluctuations of the package result in additional stresses on the fiber assembly and movement of the fibers with respect to the PIC. In some instances, this movement can be sufficient enough to break the fiber attachment to the PIC.

SUMMARY

Aspects and embodiments of the present disclosure provide an optical package assembly and method. In accordance with one aspect of the invention, the optical package assembly comprises a photonic integrated circuit (PIC) chip, at least one optical fiber coupled to the PIC chip, a fiber lid plate disposed on at least a portion of the at least one optical fiber, and a cover plate having a surface coupled to the PIC chip and the fiber lid plate.

In some embodiments, the fiber lid plate has a first surface disposed on at least a portion of the at least one optical fiber and a second surface disposed opposite the first surface, and the surface of the cover plate is coupled to the PIC chip and the second surface of the fiber lid plate with an adhesive material.

In some embodiments, the adhesive material is an epoxy. According to a further embodiment, the epoxy is a mechanical-grade epoxy. According to at least one embodiment, the at least one optical fiber is coupled to the PIC chip with an optical-grade adhesive.

In some embodiments, a thickness of the adhesive material between the surface of the cover plate and the PIC chip substantially matches that of a thickness of the adhesive material between the surface of the cover plate and the second surface of the fiber lid plate.

In some embodiments, the surface of the cover plate includes a recess that overlaps at least a portion of the second surface of the fiber lid plate. According to a further embodiment, the recess is sized such that a thickness of the adhesive material between the surface of the cover plate and the PIC chip substantially matches that of a thickness of the adhesive material between the surface of the cover plate and the second surface of the fiber lid plate.

In some embodiments, the cover plate and the fiber lid plate are constructed from the same material.

According to another embodiment, the cover plate spans a gap between the PIC chip and the fiber lid plate.

In some embodiments, the optical package assembly further includes a fiber array substrate having grooves for supporting the at least one optical fiber. According to a further embodiment, the cover plate, the fiber lid plate, and the fiber array substrate are constructed from the same material.

In some embodiments, the optical package assembly further includes a PIC substrate, wherein the PIC chip has a first surface coupled to the surface of the cover plate and a second surface disposed opposite the first surface and mounted to the PIC substrate. According to a further embodiment, the PIC substrate extends under the fiber array substrate and is configured such that a gap is defined between the PIC substrate and the fiber array substrate.

According to another aspect of the invention, a method of forming an optical package is provided. In accordance with at least one embodiment, the method comprises coupling a fiber array assembly to a photonic integrated circuit (PIC) chip, the fiber array assembly including at least one optical fiber and a fiber lid plate disposed on at least a portion of the at least one optical fiber, and attaching a surface of a cover plate to the PIC chip and the fiber lid plate.

In some embodiments, attaching the surface of the cover plate to the PIC chip includes applying an adhesive material between the surface of the cover plate and the PIC chip and between the surface of the cover plate and the fiber lid plate.

In some embodiments, applying the adhesive material is performed such that a thickness of the adhesive material between the surface of the cover plate and the PIC chip substantially matches that of a thickness of the adhesive material between the surface of the cover plate and the fiber lid plate.

In some embodiments, the method further includes providing the cover plate, wherein the cover plate is configured such that a recess is formed in the surface of the cover plate that overlaps at least a portion of the fiber lid plate, the recess configured such that a thickness of the adhesive material between the surface of the cover plate and the PIC chip substantially matches that of a thickness of the adhesive material between the surface of the cover plate and the fiber lid plate. In some embodiments, the adhesive material is a mechanical-grade epoxy.

In some embodiments, coupling the fiber array assembly to the PIC chip includes aligning the at least one optical fiber to the PIC chip. In some embodiments, coupling the fiber array assembly to the PIC chip includes applying an optical-grade epoxy. In some embodiments, the fiber array assembly further includes a fiber array substrate having grooves for supporting the at least one optical fiber, and coupling the fiber array assembly to the PIC chip includes coupling the fiber array substrate to the PIC chip using the optical-grade epoxy.

In some embodiments, the method includes providing at least one of the fiber array assembly and the cover plate.

In accordance with another aspect of the invention, an optical package assembly comprises a photonic integrated circuit (PIC) chip mounted to a PIC substrate, at least one optical fiber coupled to the PIC chip, a fiber lid plate disposed on at least a portion of the at least one optical fiber, and a cover plate having a surface coupled to the PIC substrate and the fiber lid plate.

In some embodiments, the fiber lid plate has a first surface disposed on at least a portion of the at least one optical fiber and a second surface disposed opposite the first surface, and the surface of the cover plate is coupled to the PIC substrate and the second surface of the fiber lid plate with an adhesive material.

In some embodiments, a thickness of the adhesive material between the surface of the cover plate and the PIC substrate substantially matches that of a thickness of the adhesive material between the surface of the cover plate and the second surface of the fiber lid plate.

In accordance with another aspect of the invention, an optical package assembly comprises a photonic integrated circuit (PIC) chip, at least one optical fiber coupled to the PIC chip, and a cover plate having a surface coupled to the PIC chip and the at least one optical fiber.

In some embodiments, the surface of the cover plate is coupled to the PIC chip and the at least one optical fiber with an adhesive material.

In some embodiments, a thickness of the adhesive material between the surface of the cover plate and the PIC chip substantially matches that of a thickness of the adhesive material between the surface of the cover plate and the at least one optical fiber.

In some embodiments, the adhesive material is a mechanical-grade epoxy and the at least one optical fiber is coupled to the PIC chip with an optical-grade adhesive.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Aspects of the present disclosure are related to an integrated circuit (IC) packaging structure, and more particularly, to a PIC package structure that overcomes or otherwise resolves problems described above related to conventional packaging approaches for these devices. For instance, embodiments described herein overcome problems caused by the CTE mismatch between the PIC and PIC substrate materials as well as misalignment problems caused by volumetric shrinkage of the mechanical-grade epoxy during the curing process. In one aspect of the present disclosure, an optical package assembly includes a PIC chip, at least one fiber that is coupled to the PIC chip, and a fiber lid plate disposed on at least a portion of the at least one fiber. The assembly further includes a structure in the form of a cover plate having a surface that is coupled to both the PIC chip and the fiber lid plate. Unlike the examples shown in FIGS. 1A and 1B, this configuration allows for the fiber to be mechanically coupled directly to the PIC chip itself, and not to the board or base onto which the PIC is mounted. Furthermore, adhesive material disposed both between the cover plate and the PIC chip and between the cover plate and the fiber lid plate distributes forces during the curing process such that alignment is maintained between the fiber array and the PIC, as explained in further detail below.

The embodiments described herein are directed to packaging configurations where the optical fibers are "butt-coupled" to the PIC chip via an optical-grade adhesive.

Figure 2:
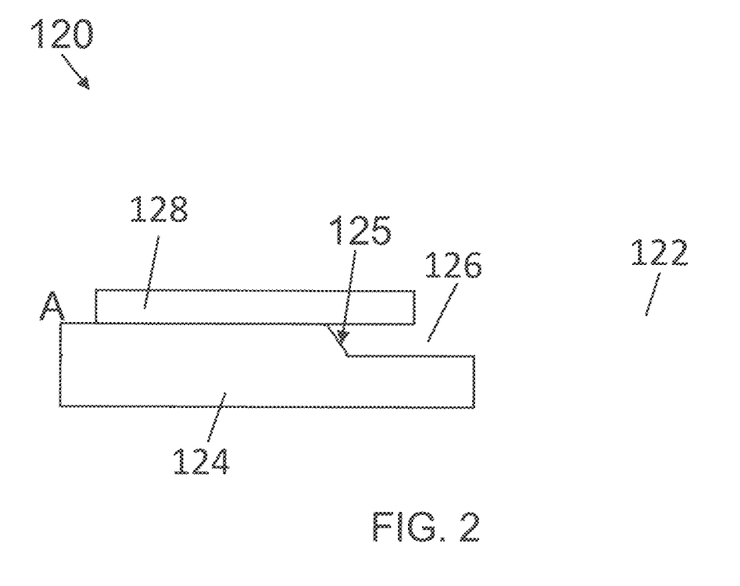
FIG. 2 is a side elevation view of one example of a fiber array assembly in accordance with aspects of the invention.
Figure 5:
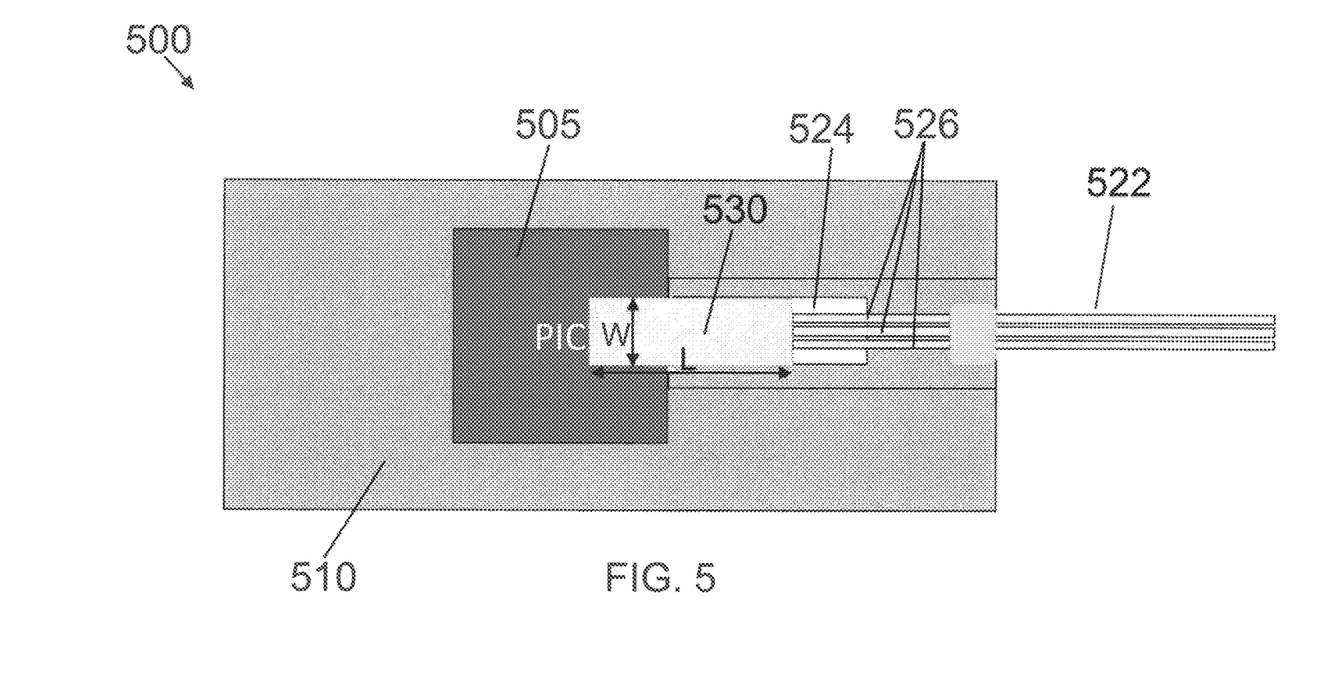
FIG. 5 is a top plan view of another example of an optical package assembly in accordance with aspects of the invention.

FIG. 2 is a side elevation view of one non-limiting example of a fiber array assembly 120 in accordance with at least one embodiment. The fiber array assembly 120 includes a fiber array 122 that includes at least one optical fiber 126 (also referred to herein as simply "fiber"). For instance, in accordance with one embodiment, the fiber array 122 includes three fibers, as can be seen in FIG. 5 that are arranged in a linear configuration (1×3). It is to be appreciated that the fiber array assembly may have a configuration with more than three fibers or less than three fibers, including embodiments with only a single fiber. According to some embodiments, the fibers 126 of the fiber array 122 may be configured to have similar performance and functional characteristics, and in other embodiments, at least two of the fibers are configured to be different from one another. For instance, one or more fibers 126 of the fiber array 122 may be configured and characterized as a polarization maintaining (PM) fiber, and one or more other fibers 126 of the fiber array 122 may be configured and characterized as a single mode (SM) fiber. It is to be appreciated that fewer numbers of fibers (e.g., one fiber) and greater numbers of fibers, including arrays of 1×N or N×M fibers are within the scope of this disclosure.

The fiber array assembly 120 may also include a fiber array substrate 124 that supports the fibers of the fiber array 122. Although not specifically shown in FIG. 2, the fiber array substrate 124 may include a plurality of grooves or guide channels and is configured such that the fibers are disposed within the plurality of grooves. The grooves may have a V-shaped or U-shaped cross-section and are arranged parallel to one another. One end of the fibers, indicated at "A" in FIG. 2, aligns to the PIC chip (discussed in further detail below) via an edge coupler or other coupling structure.

The fiber array assembly 120 may also include a fiber lid plate 128 that is disposed on at least a portion of the at least one fiber 126 of the fiber array 122. The fiber lid plate 128 may be planar in structure. The fiber lid plate 128 may be in contact with an upper portion of the fiber(s) 126 in the fiber array 122. For instance, a bottom surface of the fiber lid plate (e.g., surface 352 in FIG. 3 discussed below) may be in contact with an upper portion of the fibers 126. In some instances, this bottom surface of the fiber lid plate 128 may have grooves that correspond with those disposed in the fiber array substrate 124 when the fiber array assembly 120 is constructed. In some instances, an adhesive (e.g., a sol-gel) is disposed between the at least one fiber 126 and the fiber lid plate 128 and/or between the at least one fiber 126 and the fiber array substrate 124. In some instances, void areas between the fiber lid plate 128, the at least one fiber 126, and the fiber array substrate 124 may be filled with a cross-linking filler, such as an epoxy.

As indicated in FIG. 2, the fiber array substrate 124 may include a "lip" feature 125 dimensioned to accommodate various fiber geometries and configurations, including a difference in diameter difference between an uncoated and coated portion of the fibers 126. The fiber lid plate 128 may be configured to cover at least a portion of the fibers 126.

In accordance with at least one embodiment, the fiber array substrate 124 and the fiber lid plate 128 are constructed from the same material. According to some embodiments, this material may be a glass, such as silicon dioxide, quartz, or a silicon, including silicon coated with silicon dioxide. Use of the same material ensures that the fiber array substrate 124 and the fiber lid plate 128 both have the same coefficient of thermal expansion (CTE), which helps minimize potential misalignment issues between the fiber array assembly and the PIC.

Figure 3:
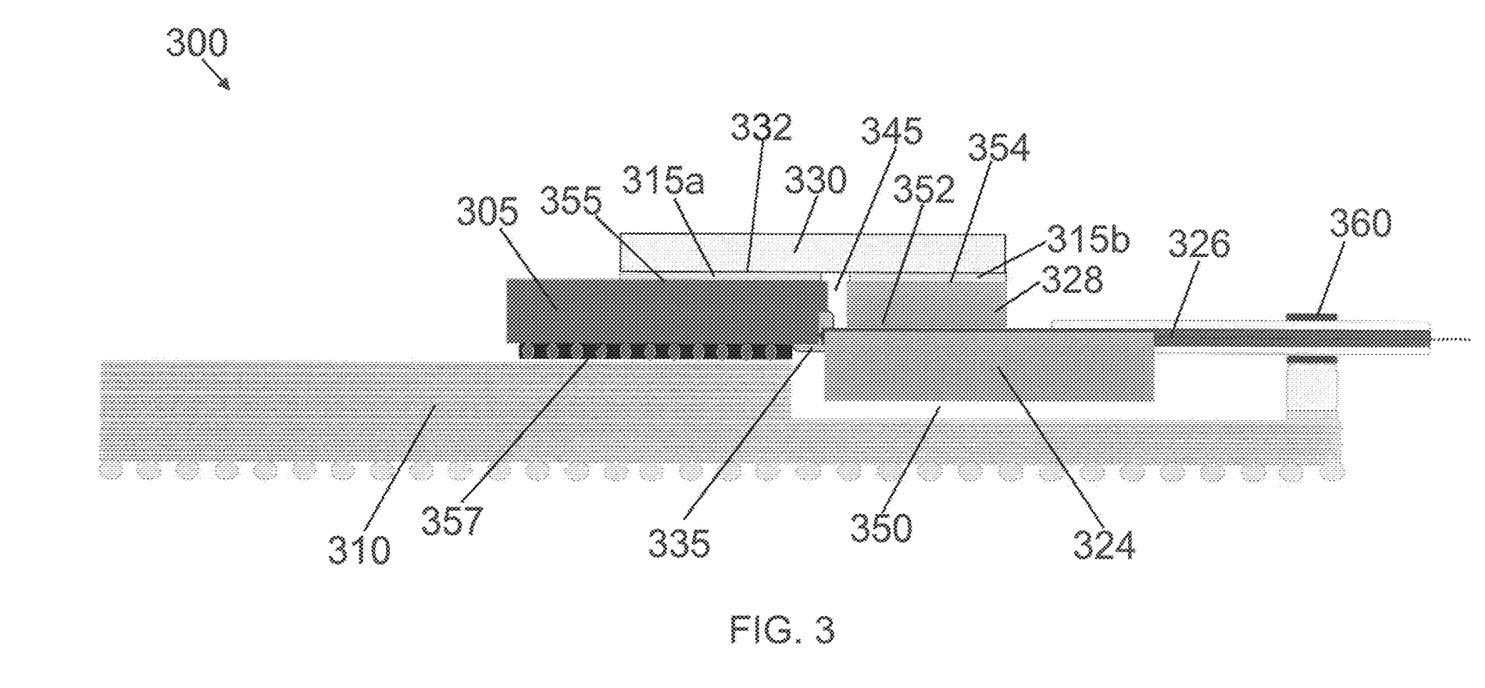
FIG. 3 is a cross-sectional side view of one example of an optical package assembly in accordance with aspects of the invention.

FIG. 3 is a cross-sectional side view of an optical package assembly 300 (also referred to herein as simply an "optical package" or "PIC package" or "optical assembly") in accordance with at least one embodiment of the present disclosure. As shown, the optical package assembly 300 includes a PIC chip 305. As previously discussed, the PIC chip 305 includes one or more PICs and may include both optical and electrical devices, such as laser diodes, photodiodes, driver circuits, amplifiers, phase modulators, lasers, mirrors, waveguides, etc. In the example shown in FIG. 3, the PIC chip 305 is mounted to a PIC substrate 310 by flip-chip bonding. The PIC substrate 310 can provide both mechanical and electrical support for the PIC chip. According to one embodiment, the PIC substrate 310 is a semiconductor, organic, or ceramic material, such as a low-temperature co-fired ceramic (LTCC) multilayer board. Other types of substrates for the PIC are also within the scope of this disclosure, including printed circuit board (PCB) substrates.

The optical package assembly 300 also includes at least one fiber 326 that is coupled to the PIC chip 305 and a fiber lid plate 328 that is disposed on at least a portion of the at least one fiber 326. In some instances, the at least one fiber 326 is one of multiple fibers included in a fiber array. A fiber array substrate 324 may also be used to support the at least one fiber 326. The at least one fiber 326, fiber lid plate 328, and fiber array substrate 324 are all part of a fiber array assembly similar to that previously described in reference to fiber array assembly 120 in FIG. 2, although in some instances the optical package assembly may not include at least one of the fiber lid plate or fiber array substrate which is the case for the configuration shown in FIG. 7. The at least one fiber 326 is first aligned and then coupled to the PIC chip 305 with an optical-grade adhesive 335, such as an optical-grade epoxy. In some instances, the fiber array substrate 324 may also be coupled to the PIC chip 305 with the optical-grade adhesive 335. The optical-grade adhesive 335 is sufficiently transparent in the desired wavelength or wavelength range, and also acts as an index matching material to reduce light reflections and possible interference, and may be ultra-violet (UV) curable. The optical-grade adhesive 335 may be an epoxy that is silicone-based. One non-limiting example of an optical-grade adhesive is Norland optical adhesive 63 (NOA63, manufactured by Norland Products Inc. of Cranbury, NJ).

As indicated in FIG. 3, the optical package assembly 300 also includes a cover plate 330 that has a surface 332 that is coupled to both the PIC chip 305 and the fiber lid plate 328. It is to be appreciated that in instances where a fiber lid plate is not used, the surface 332 of the cover plate 330 will be coupled directly to the fiber(s) 326. As shown in FIG. 3, the surface 332 of the cover plate 330 is planar and the cover plate 330 is rectangular in shape. In some instances, the cover plate 330 has a width "W" (more clearly seen in FIG. 5) that corresponds with dimensions of the fiber array assembly, including the width dimension of the fiber array substrate 324 and/or fiber lid plate 328 (e.g., the width of the cover plate is the same or substantially similar to the width of the fiber array substrate). As will be appreciated, other shapes for the lid plate are within the scope of this disclosure, including square shapes and shapes tailored for a specifically desired geometry. The cover plate 330 is also rigid enough to absorb or otherwise accommodate vibrational movement of the fiber array substrate 324. In accordance with at least one embodiment, the cover plate 330 has a thickness of at least 1 mm. At least a portion of the cover plate 330 extends over the at least one fiber 326.

The fiber lid plate 328 includes a first or bottom surface 352 disposed on at least a portion of the at least one fiber 326 and a second or top surface 354 disposed opposite the first surface. The second surface 354 is planar and is positioned adjacent to the surface 332 of the cover plate 330. The surface 332 of the cover plate 330 is coupled to the second surface 354 of the fiber lid plate 328 and the PIC chip 305 with an adhesive material 315, with FIG. 3 showing that adhesive material labeled as 315a (which may also be referred to herein as a first region 315a of adhesive material) couples the surface 332 of the cover plate 330 to the PIC chip 305, and adhesive material labeled as 315b (which may also be referred to herein as a second region 315b of adhesive material) couples the surface 332 of the cover plate 330 to the second surface 354 of the fiber lid plate 328. In some embodiments, the PIC chip 305 has a first surface 355 that is positioned adjacent to the surface 332 of the cover plate 330, and thus adhesive material 315a couples this first surface 355 to the surface 332 of the cover plate 330. The first surface 355 of the PIC chip 305 may be planar. The PIC chip 305 may also have a second bottom surface 357 disposed opposite the first surface 355 that is mounted to the PIC substrate 310. In some instances, the second surface 357 of the PIC chip 305 is planar.

In accordance with some embodiments, the cover plate 330 and fiber lid plate 328 are constructed from the same material. In a further embodiment, the cover plate 330, fiber lid plate 328, and fiber array substrate 324 are constructed from the same material. Non-limiting examples of this material may be those as described above in reference to the fiber array substrate 124 and fiber lid plate 128 of FIG. 2, and include glass materials, such as silicon dioxide, or quartz, or silicon materials. Using the same material allows for these structural components to have the same CTE, thereby minimizing or reducing the risk of creating misalignment between the fibers and PIC chip when the package experiences temperature variations.

According to at least one embodiment, the adhesive material 315 (315a, 315b) is an epoxy, and in some embodiments, the adhesive material 315 is a mechanical-grade epoxy. Epoxy adhesives are polymer materials that may be reacted (cross-linked) either with themselves or with a co-reactant, with the cross-linking reaction referred to as curing. One non-limiting example of a mechanical-grade epoxy is OPTOCAST™ 3408 (manufactured by Electronic Materials Inc. of Breckenridge, CO), which is UV and/or heat cured. Since the adhesive material 315 used to couple the cover plate 330 to both the PIC chip 305 and the fiber lid plate 328 does not lie in an optical path, a wider range of adhesive (e.g., epoxy) materials can be used than the optical-grade adhesive materials (e.g., 335 in FIG. 3) described above that are used to couple the fiber(s) 326 to the PIC chip 305. For instance, the mechanical-grade adhesive 315 does not have to be an index matching material or be transparent to wavelengths transmitted by the fibers 326 and/or PIC chip 305. The mechanical-grade adhesive 315 is a structural adhesive composition that functions to mechanically couple the cover plate 330 to both the PIC chip 305 and the fiber lid plate 328 and may have superior mechanical properties than that of the optical-grade adhesive material 335.

In some instances, the regions or sections of adhesive material 315a and 315b are applied such that the adhesive material covers or substantially covers regions of the surface 332 of the cover plate 330 that are disposed over each of the PIC chip 305 and the fiber lid plate 328 (and the respective regions of the surfaces of the PIC chip and fiber lid plate). This may include applying the adhesive material 315a and 315b such that it extends across the entire width of the cover plate 330 (e.g., see "W" FIG. 5), but is discontinuous in the length direction to correspond to each of the regions of adhesive material 315a and 315b. In other instances, adhesive material 315a and 315b may each be applied in a pattern, including a discontinuous pattern (e.g., two or more "drops" or "dots"), a continuous pattern (e.g., an "S" or "Z" or square or rectangular shape), or as a single circular shape (e.g., a large "drop" or "dot"), each of which do not cover the entire interface between the surface 332 of the cover plate 330 and each of the PIC chip 305 and fiber lid plate 328.

According to one embodiment, a thickness of the adhesive material 315a between the surface 332 of the cover plate 330 and the PIC chip 305 substantially matches that of a thickness of the adhesive material 315b between the surface 332 of the cover plate 330 and the fiber lid plate 328. This reduces mechanical or other types of strain within the configuration of the assembly 300 that could create fiber misalignment. For instance, differences in the thicknesses of adhesive material 315a and 315b can cause the cover plate and/or the fibers to bend due to differences in the shrinkage of the adhesive material under these different sections of the cover plate. The cover plate 330 may also be configured to span an open space or gap 345 that exists between the PIC chip 305 and the fiber lid plate 328. In some instances, the dimensions of this gap 345 correspond to a distance that separates adhesive material 315a (coupling the cover plate 330 to the PIC chip 305) from adhesive material 315b (coupling the cover plate 330 to the fiber lid plate 328) on the surface 332 of the cover plate 330.

According to at least one embodiment, the PIC substrate 310 extends under the at least one fiber 326 or the fiber array substrate 324, and in some instances the PIC substrate 310 extends under these features such that a gap 350 is defined between the PIC substrate 310 and the at least one fiber 326 or fiber array substrate 324, as shown in FIG. 3. An optional stress-relief attachment 360 may also be included in the optical package assembly 300 that functions to provide additional support to the at least one fiber 326.

Unlike the conventional packaging structures such as those shown in FIGS. 1A and 1B, the cover plate 330 provides mechanical attachment or coupling between the at least one fiber 326 and the PIC 305 itself, rather than to the support structure of the PIC (e.g., 310). The cover plate 330 is attached from the same side (i.e., surface 332) to both the PIC chip 305 and to the at least one fiber 326, which ensures that shrinkage experienced by the adhesive material 315a and 315b during the curing process preserves or otherwise maintains the alignment between the at least one fiber 326 and the PIC chip 305. In some instances, shrinkage of the adhesive material 315a and 315b will result in movement of the cover plate 330. For example, shrinkage in each region (315a and 315b) of the adhesive material during the curing process may create a downward or upward force on the cover plate 330, which is itself disposed on either side of the fiber attachment to the PIC, and results in movement of the cover plate 330. Since the cover plate 330 is attached to both the PIC chip 305 and the fiber lid plate 328, any displacement by the cover plate 330 can be mimicked by the PIC chip 305 and the fiber lid plate 328. This minimizes or otherwise eliminates any forces (e.g., vertical forces) exerted on the fiber attachment to the PIC that could cause misalignment. In other words, the mutual position of the at least one fiber 326 and the PIC chip 305 does not change during the curing process, and alignment is preserved. The use of the cover plate 330 can therefore provide for the ability of the at least one fiber 326 to maintain an alignment accuracy to the PIC chip 305 to a fraction of a micron during (and after) the curing process of the adhesive material 315. This alignment accuracy is further enhanced when the cover plate, fiber lid plate, and fiber array substrate are all constructed from the same material, as mentioned previously.

Figure 4:
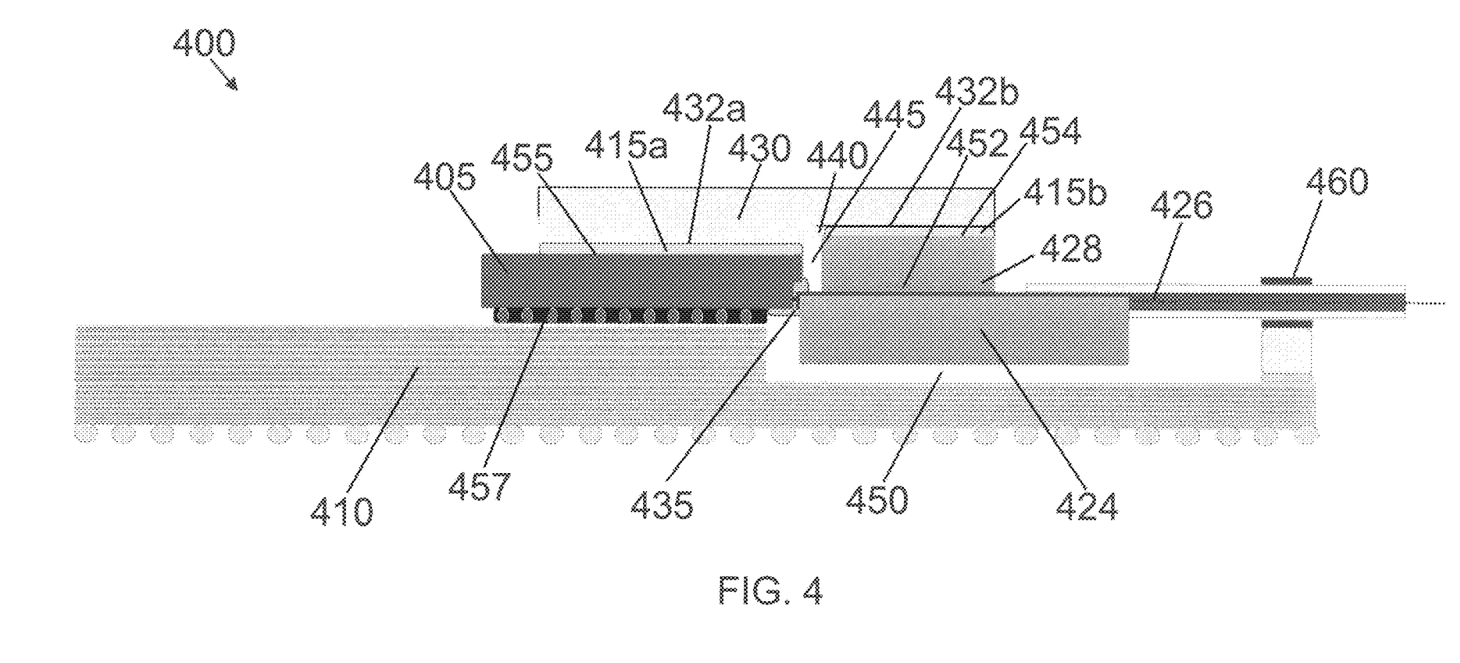
FIG. 4 is a cross-sectional side view of another example of an optical package assembly in accordance with aspects of the invention.

FIG. 4 is a cross-sectional side view of an optical package assembly 400 in accordance with another embodiment of the present disclosure. Optical package 400 is nearly identical in construction to optical package 300 shown in FIG. 3, except that the cover plate 430 includes a recess 440 that overlaps at least a portion of the fiber lid plate 428 (i.e., second surface 454 of the fiber lid plate 428). A first portion or region 432a of the surface of the cover plate 430 couples to the PIC chip 405 and a second portion or region 432b (i.e., at least a portion of the recessed geometry) of the cover plate 430 couples to the fiber lid plate 428. The recess 440 is sized such that it functions to accommodate different package geometries so that the respective thicknesses of the first region of adhesive material 415a coupling the cover plate 430 to the PIC chip 405 and the second region of adhesive material 415b coupling the cover plate 430 to the fiber lid plate 428 can be the same or substantially the same. For instance, fibers included in a fiber array may be too large to allow for a continuous surface of the cover plate 430 like that of surface 332 of cover plate 330 discussed above in reference to FIG. 3.

Other components of the optical package 400, such as the at least one fiber 426, the fiber lid plate 428, and the fiber array substrate 424, as well as the PIC chip 405, PIC substrate 410, adhesive material 415a, 415b, and optical-grade adhesive 435 are identical or nearly identical to that of optical package 300 discussed above in reference to FIG. 3 and therefore their details will not be repeated here.

Turning now to FIG. 5, a top plan view of an optical package 500 is shown that is structured similar to either of the configurations described above in reference to optical packages 300 and 400 of FIGS. 3 and 4, respectively. In this instance, the at least one fiber 526 includes three fibers included in a fiber array 522. As indicated, the cover plate 530 is rectangular in shape, having a length (labeled as "L" in FIG. 5) and a width (labeled as "W" in FIG. 5), with the length having a longer dimension than the width dimension, with the length being oriented to be parallel to the parallel arrangement of the fiber(s) 526 of the fiber array 522. As discussed above, the cover plate 530 is coupled to both the PIC chip 505 and the fiber lid plate (which in this view is under cover plate 530 and out of view).

Figure 6A:
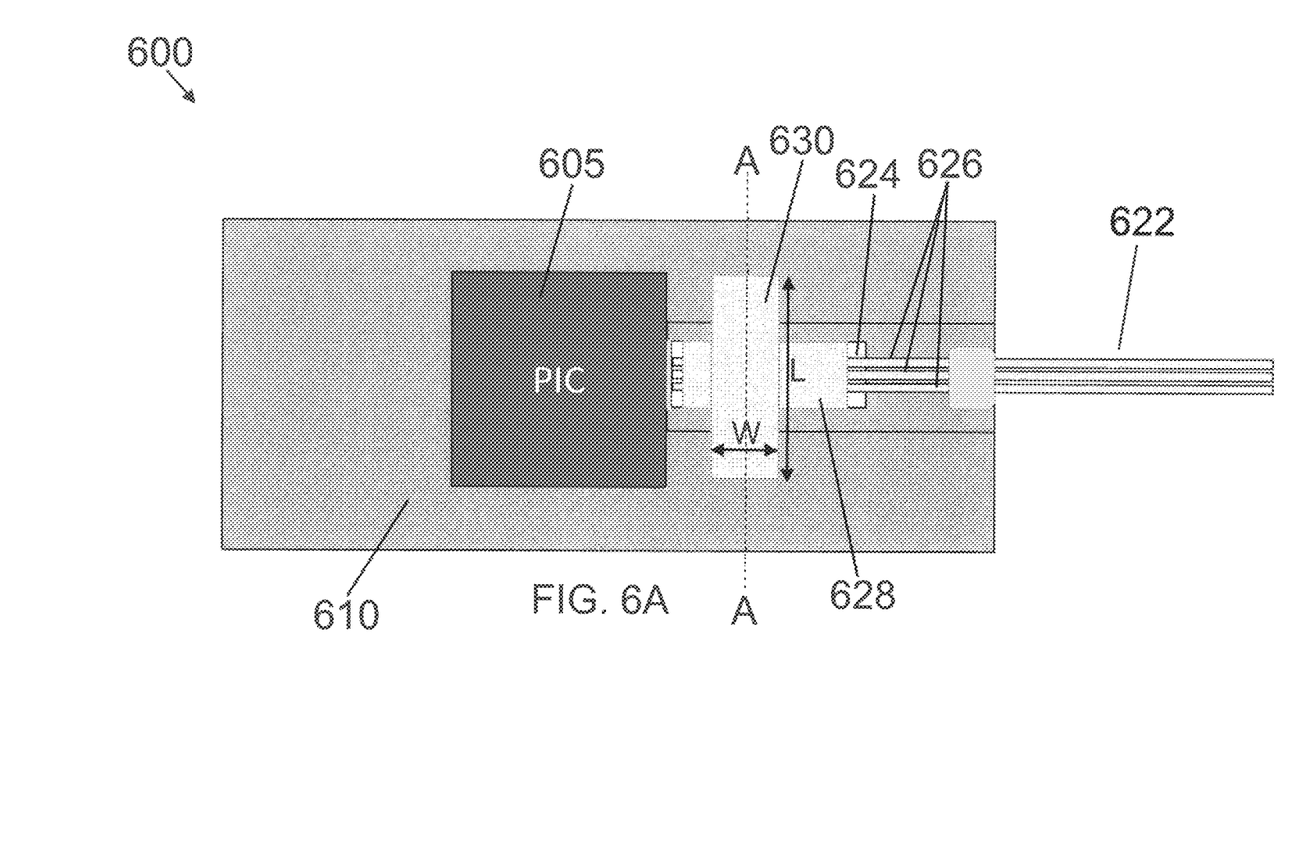
FIG. 6A is a top plan view of yet another example of an optical package assembly in accordance with aspects of the invention.
Figure 6B:
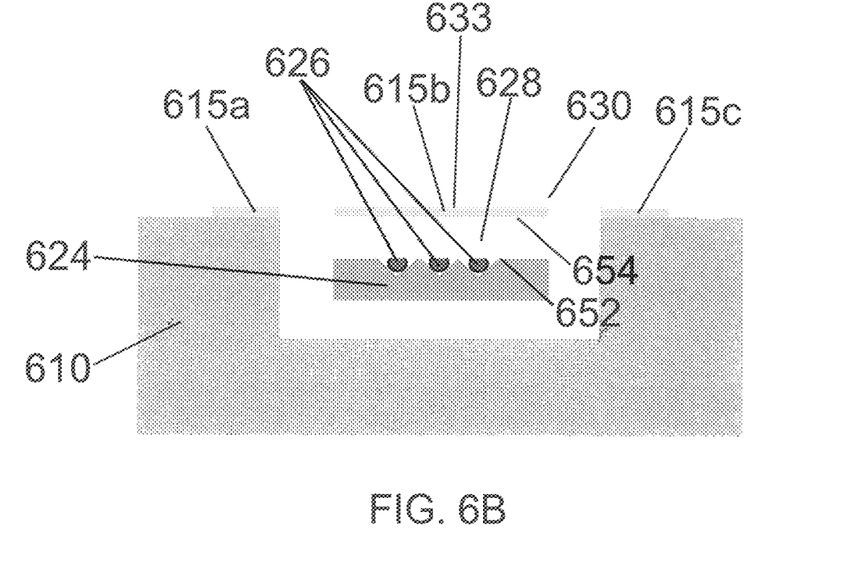
FIG. 6B is a cross-sectional side view taken along line A-A of the optical package assembly in FIG. 6A.

According to an alternate embodiment, a top plan view of an optical package 600 is shown in FIG. 6A, and a cross-sectional view taken along line A-A of FIG. 6A is shown in FIG. 6B. Optical package 600 includes similar components as described above in reference to optical packages 300, 400, and 500 described above, but in this configuration, the cover plate 630 is rotated 90 degrees and is coupled to the PIC substrate 610 on either side of the fiber lid plate 628. In this example, the cover plate 630 is also rectangular in shape, with the length dimension oriented such that it is perpendicular to the parallel arrangement of the fibers 626 of the fiber array 622. The length of the cover plate 630 may be sufficient to mechanically attach to the PIC substrate 610, i.e., end portions of the cover plate 630 overlap the PIC substrate 610 to a degree sufficient enough to provide mechanical support.

As indicated in FIG. 6B, the fiber lid plate 628 includes a first or bottom surface 652 disposed on at least a portion of the at least one fiber 626 and a second or top surface 654 disposed opposite the first surface 652. A surface 633 of the cover plate 630 is coupled to the second surface of the fiber lid plate 628 and the PIC substrate 610 with adhesive material 615. In this instance, three regions of the surface 633 of the cover plate 630 include adhesive material 615. For example, FIG. 6B shows that adhesive material labeled as 615a (e.g., first region or portion of adhesive material) couples the cover plate 630 to the PIC substrate 610, adhesive material labeled as 615b (e.g., second region or portion of adhesive material) couples the cover plate 630 to the fiber lid plate 628, and adhesive material labeled as 615c (e.g., third region or portion of adhesive material) couples the cover plate 630 to the PIC substrate 610. Adhesive material 615 is the same as adhesive materials 315 and 415 described above, and may therefore be a mechanical-grade epoxy. Regions 615a and 615c of adhesive material are applied to perimeter or outer regions of the cover plate 630 that overlay the PIC substrate 610, whereas region 615b of the adhesive material is applied to a center region of the cover plate 630 that overlays the fiber lid plate 628. Each of portions 615a, 615b, and 615c of the adhesive material may have substantially similar thicknesses, i.e., a thickness of the adhesive material between the surface 633 of the cover plate 630 and the PIC substrate 610 substantially matches that of a thickness of the adhesive material between the surface 633 of the cover plate 630 and the second surface 654 of the fiber lid plate 628. The adhesive material 615 can be applied in a similar manner as described above, e.g., such that it extends across the entire width of the cover plate 630, but is discontinuous in the length direction to correspond to each of the regions 615a, 615b, and 615c, and can be applied in a pattern that is discontinuous or continuous. Other components of the optical package 600, such as the fiber array substrate 624 and PIC chip 605 are identical or nearly identical to that of the optical packages discussed previously and in the interest of brevity will not be repeated here.

The configuration shown in FIGS. 6A and 6B may be used in instances where attachment of the cover plate to the PIC chip is not possible. Furthermore, this configuration also provides advantages over the conventional packaging methods shown in FIGS. 1A and 1B. For example, when the thickness of the adhesive material between the cover plate 630 and the fiber lid plate 628 (i.e., 615b) is the same or substantially similar to the thickness of the adhesive material between the cover plate 630 and the PIC substrate 610 (i.e., 615a and 615b), then any shrinkage or expansion of the adhesive material during the curing process will move only the cover plate 630 in a vertical direction with respect to the PIC substrate 610 and to the fiber lid plate 628, while keeping the relative position between the fiber lid plate 628 and the PIC substrate 610 unchanged. Since the PIC chip 605 is attached to the PIC substrate 610, this means that shrinkage of the adhesive material 615 will not change the relative position between the PIC chip 605 and the fiber lid plate 628 (and hence the at least one fiber 626).

Figure 7:
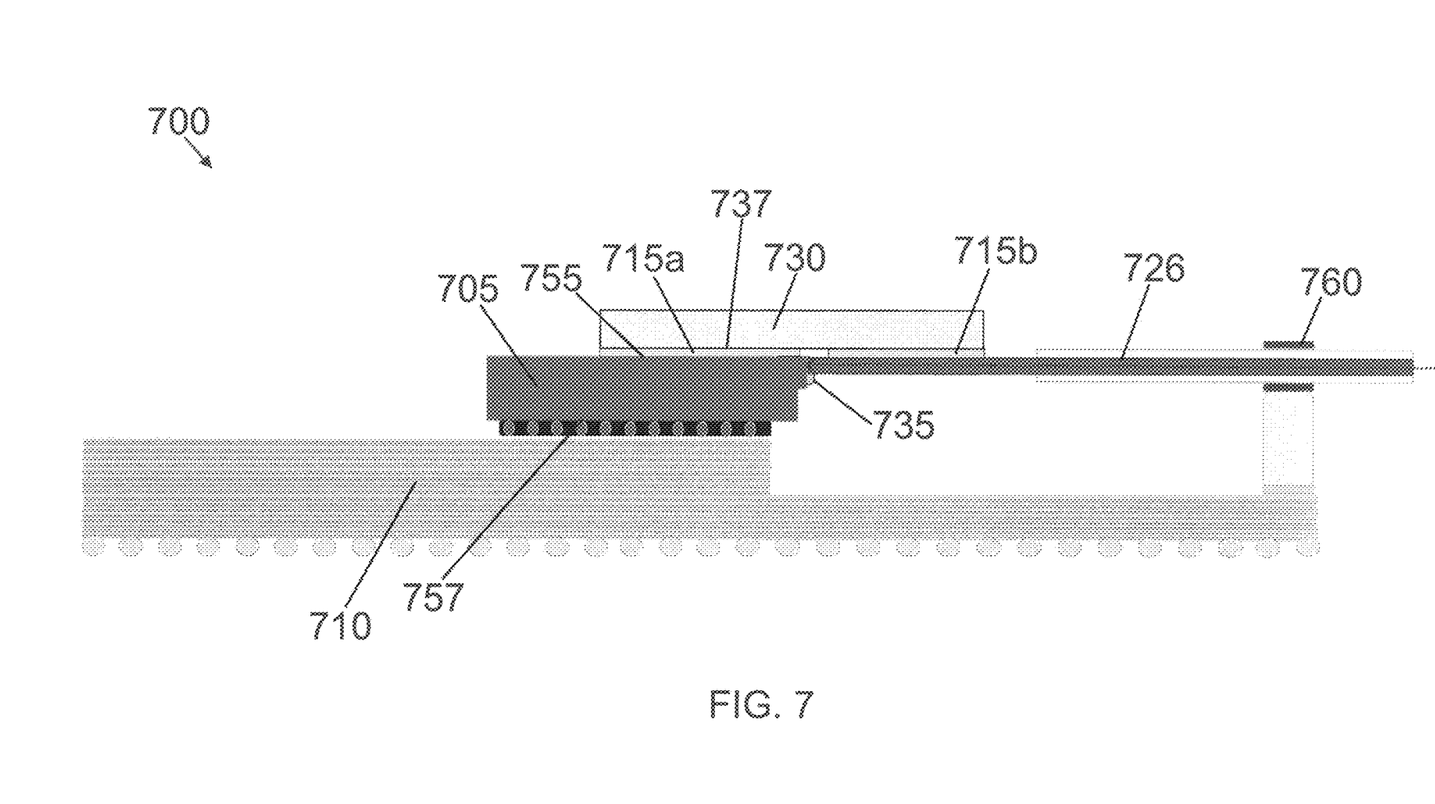
FIG. 7 is a cross-sectional side view of another example of an optical package assembly in accordance with aspects of the invention.

An optical package assembly, generally indicated at 700, is shown in FIG. 7 in accordance with another embodiment. In this configuration, the fiber arrangement does not include at least one of the fiber lid plate and fiber array substrate, and may be used in applications where a single fiber (or few fibers) is desired, or in instances where the fiber lid plate and/or fiber array substrate are not desired. The optical package assembly 700 includes the PIC chip 705 and the at least one fiber 726 as described above, but in this instance the cover plate 730 is coupled to both the PIC chip 705 and directly to the at least one fiber 726. The cover plate 730 has a surface 737 that is coupled to the PIC chip 705 and the at least one fiber 726. In a similar manner as described above in reference to the adhesive material 315a, 315b and 415a, 415b of FIGS. 3 and 4, a thickness of the adhesive material 715a between the surface 737 of the cover plate 730 and the PIC chip 705 substantially matches that of a thickness of the adhesive material 715b between the surface 737 of the cover plate 730 and the at least one fiber 726. Similar benefits discussed above bestowed to the optical package by the presence of the cover plate are also present in this configuration. For example, during the cure process, both portions of adhesive material 715a and 715b will shrink to the same degree, and because the cover plate 730 is attached to both the PIC chip 705 and the fiber 726, the mutual position of the fiber 726 and the PIC chip 705 does not change during the curing process, which preserves alignment. Other components of the optical package 700, such as the PIC chip 705, PIC substrate 710, adhesive material 715a, 715b, and optical-grade adhesive 735 are identical or nearly identical to those described previously and in the interest of brevity their details will not be repeated here. In addition, the cover plate 730 can include a recess similar to the recess 440 described above in reference to FIG. 4, or the cover plate 730 can be turned 90 degrees, as shown in the optical package assembly 600 of FIGS. 6A and 6B.

Figure 8:
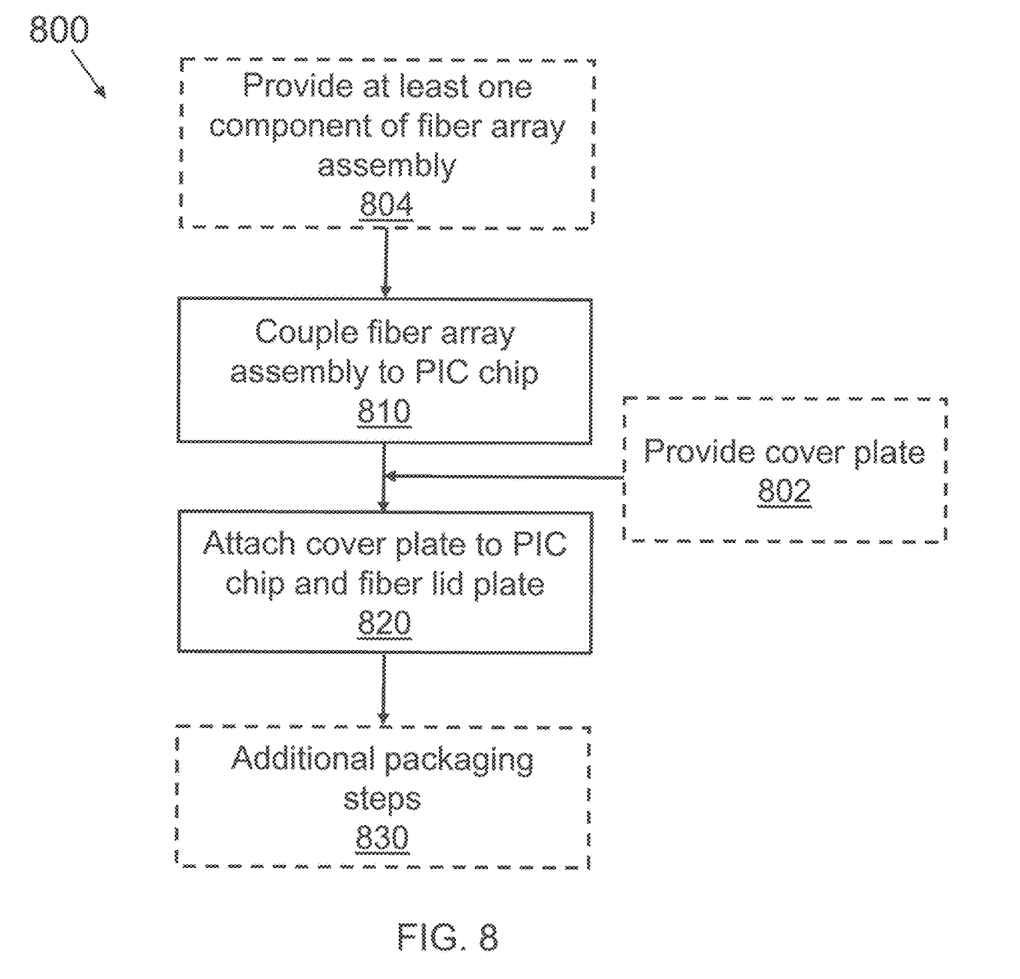
FIG. 8 is a block/flow diagram showing an illustrative method for fabricating an optical package in accordance with aspect of the invention.

Referring to FIG. 8, a method 800 of forming an optical package (e.g., 300, 400, 500 as shown in FIGS. 3, 4, and 5) is illustratively shown. The method 800 may begin with a process 810 that includes coupling a fiber array assembly to a PIC chip. The fiber array assembly may include at least one optical fiber and a fiber lid plate that is disposed on at least a portion of the fiber array. Process 810 may comprise applying an optical-grade adhesive to couple the fiber array assembly to the PIC chip, which may include coupling the at least one fiber to the PIC chip with the optical-grade adhesive. The fiber array assembly may also include a fiber array substrate having grooves that support the at least one fiber, and in some instances process 810 may include coupling the fiber array substrate to the PIC chip using the optical-grade adhesive. In some instances, process 810 includes coupling at least one fiber to the PIC chip instead of the fiber array assembly (e.g., a configuration as shown in FIG. 7 where there is no fiber lid plate and/or fiber array substrate). Process 810 may also comprise aligning the at least one fiber to the PIC chip prior to applying the optical-grade adhesive.

The method 800 also includes a process 820 of attaching a cover plate to the PIC chip and the fiber lid plate. For instance, a surface of the cover plate may be attached to both the PIC chip and the fiber lid plate. The attachment process 820 can include applying an adhesive material between the surface of the cover plate and the PIC chip and between the surface of the cover plate and the fiber lid plate. In some instances, the adhesive material is a mechanical-grade epoxy. According to one embodiment, applying the adhesive material is performed in such a way that a thickness of the adhesive material between the surface of the cover plate and the PIC chip substantially matches that of a thickness of the adhesive material between the surface of the cover plate and the fiber lid plate. In terms of timing, in some instances the attachment process 820 may commence once the optical-grade adhesive used in process 810 is completely cured.

Optional steps that can be included in method 800 include providing at least one component of the fiber array assembly (process 804) and/or the cover plate (process 802). In some instances, the cover plate is configured such that a recess is formed in the surface of the cover plate, where the recess overlaps at least a portion of the fiber lid plate (once the cover plate is attached in process 820). Additional packaging steps can also optionally be included in method 800 as process 830.

It is to be appreciated that the method 800 can be adapted to accommodate any of the configurations described herein, including optical package assemblies 600 and 700 of FIGS. 6A, 6B, and 7. For instance, attachment process 820 may instead include coupling the cover plate to the PIC substrate (as per FIGS. 6A and 6B), or include coupling the cover plate to the PIC chip and the at least one fiber (as per FIG. 7, where the fiber array assembly does not include a fiber lid plate).

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An optical package assembly comprising:
   a photonic integrated circuit (PIC) chip;
   at least one optical fiber coupled to the PIC chip;
   a fiber lid plate disposed on at least a portion of the at least one optical fiber; and
   a cover plate having a surface coupled to the PIC chip and the fiber lid plate.

2. The optical package assembly of claim 1, wherein the fiber lid plate has a first surface disposed on at least a portion of the at least one optical fiber and a second surface disposed opposite the first surface, and the surface of the cover plate is coupled to the PIC chip and the second surface of the fiber lid plate with an adhesive material.

3. The optical package assembly of claim 2, wherein the adhesive material is an epoxy.

4. The optical package assembly of claim 3, wherein the epoxy is a mechanical-grade epoxy.

5. The optical package assembly of claim 2, wherein a thickness of the adhesive material between the surface of the cover plate and the PIC chip substantially matches a thickness of the adhesive material between the surface of the cover plate and the second surface of the fiber lid plate.

6. The optical package assembly of claim 2, wherein the surface of the cover plate includes a recess that overlaps at least a portion of the second surface of the fiber lid plate.

7. The optical package assembly of claim 6, wherein the recess is sized such that a thickness of the adhesive material between the surface of the cover plate and the PIC chip substantially matches a thickness of the adhesive material between the surface of the cover plate and the second surface of the fiber lid plate.

8. The optical package assembly of claim 1, wherein the cover plate and the fiber lid plate are constructed from the same material.

9. The optical package assembly of claim 1, wherein the cover plate spans a gap between the PIC chip and the fiber lid plate.

10. The optical package assembly of claim 1, wherein the at least one optical fiber is coupled to the PIC chip with an optical-grade adhesive.

11. The optical package assembly of claim 1, further comprising a fiber array substrate having grooves for supporting the at least one optical fiber.

12. The optical package assembly of claim 11, wherein the cover plate, the fiber lid plate, and the fiber array substrate are constructed from the same material.

13. The optical package assembly of claim 11, further comprising a PIC substrate, wherein the PIC chip has a first surface coupled to the surface of the cover plate and a second surface disposed opposite the first surface and mounted to the PIC substrate.

14. The optical package assembly of claim 13, wherein the PIC substrate extends under the fiber array substrate and is configured such that a gap is defined between the PIC substrate and the fiber array substrate.

15. A method of forming an optical package, comprising:
    coupling a fiber array assembly to a photonic integrated circuit (PIC) chip, the fiber array assembly including at least one optical fiber and a fiber lid plate disposed on at least a portion of the at least one optical fiber; and
    attaching a surface of a cover plate to the PIC chip and the fiber lid plate.

16. The method of claim 15, wherein attaching includes applying an adhesive material between the surface of the cover plate and the PIC chip and between the surface of the cover plate and the fiber lid plate.

17. The method of claim 16, wherein applying the adhesive material is performed such that a thickness of the adhesive material between the surface of the cover plate and the PIC chip substantially matches a thickness of the adhesive material between the surface of the cover plate and the fiber lid plate.

18. The method of claim 16, further comprising providing the cover plate, wherein the cover plate is configured such that a recess is formed in the surface of the cover plate that overlaps at least a portion of the fiber lid plate, the recess configured such that a thickness of the adhesive material between the surface of the cover plate and the PIC chip substantially matches a thickness of the adhesive material between the surface of the cover plate and the fiber lid plate.

19. The method of claim 16, wherein the adhesive material is a mechanical-grade epoxy.

20. The method of claim 15, wherein coupling the fiber array assembly to the PIC chip includes applying an optical-grade epoxy.

21. The method of claim 20, wherein the fiber array assembly further includes a fiber array substrate having grooves for supporting the at least one optical fiber, and coupling the fiber array assembly to the PIC chip includes coupling the fiber army substrate to the PIC chip using the optical-grade epoxy.

22. The method of claim 15, wherein coupling the fiber array assembly to the PIC chip includes aligning the at least one optical fiber to the PIC chip.

23. The method of claim 15, further comprising providing at least one of the fiber array assembly and the cover plate.

24. An optical package assembly comprising:
a photonic integrated circuit (PIC) chip mounted to a PIC substrate;
at least one optical fiber coupled to the PIC chip;
a fiber lid plate disposed on at least a portion of the at least one optical fiber; and
a cover plate having a surface coupled to the PIC substrate and the fiber lid plate.

25. The optical package assembly of claim 24, wherein the fiber lid plate has a first surface disposed on at least a portion of the at least one optical fiber and a second surface disposed opposite the first surface, and the surface of the cover plate is coupled to the PIC substrate and the second surface of the fiber lid plate with an adhesive material.

26. The optical package assembly of claim 25, wherein a thickness of the adhesive material between the surface of the cover plate and the PIC substrate substantially matches a thickness of the adhesive material between the surface of the cover plate and the second surface of the fiber lid plate.

27. An optical package assembly comprising:
a photonic integrated circuit (PIC) chip;
at least one optical fiber coupled to the PIC chip; and
a cover plate having a surface coupled to the PIC chip and the at least one optical fiber.

28. The optical package of claim 27, wherein the surface of the cover plate is coupled to the PIC chip and the at least one optical fiber with an adhesive material.

29. The optical package assembly of claim 28, wherein a thickness of the adhesive material between the surface of the cover plate and the PIC chip substantially matches a thickness of the adhesive material between the surface of the cover plate and the at least one optical fiber.

30. The optical package of claim 28, wherein the adhesive material is a mechanical-grade epoxy and the at least one optical fiber is coupled to the PIC chip with an optical-grade adhesive.

* * * * *